UNITED STATES PATENT OFFICE.

ALFRED B. ELY, OF NEWTON, MASSACHUSETTS.

IMPROVEMENT IN INSULATING TELEGRAPH-WIRES.

Specification forming part of Letters Patent No. 51,935, dated January 9, 1866; Reissue No. 2,212, dated March 27, 1866.

*To all whom it may concern:*

Be it known that I, ALFRED B. ELY, of Newton, in the county of Middlesex and State of Massachusetts, have invented a new and useful Method of Insulating Telegraph-Wires and their Supports; and I do hereby declare that the following is a full, clear, and accurate description of my invention.

The materials usually employed are often too fragile for durability, or undergo changes by exposure and time for the worse, and, besides, are often quite expensive.

The object of my invention is to furnish a new and useful, and at the same time an inexpensive, method of insulating telegraph-wires and their supports; and it consists, first, in coating the wires (metallic or covered) or their supports with paraffine, or with paraffine and rubber or its equivalent; and, second, in manufacturing telegraph-conductors by covering them with any suitable fiber and saturating with the composition. To carry out these objects I immerse the wire or other article to be insulated in paraffine, or paraffine and rubber or gutta-percha mixed in any suitable proportions, and draw the wire therefrom onto a reel with such rapidity only as will permit a coating of the composition to adhere to and form upon the wire. This may be repeated, if desired; or the wire may be immersed in the material in any suitable manner and for such period as may be found expedient. Again, I cover the wire by any of the most approved methods with cotton, linen, or other fibrous covering, and saturate the wire so covered or the covering with paraffine or paraffine and rubber in proper parts melted together, and so as to completely incorporate the composition with the fibrous covering and leave, if desirable, a coating of the composition on the outside.

When I desire to insulate or to improve the insulating capacity of the brackets, cross-arms, or any other supports for telegraph-wires, I apply my composition of paraffine or paraffine and rubber warm in successive layers; or I heat it in when applied; or I dip them into the prepation, as may be most convenient, until a sufficient saturation thereof or a sufficient thickness of coating is attained.

I claim the use of paraffine or of paraffine mixed with rubber or gutta-percha in any suitable proportion for the purpose. Ordinarily from one-eighth to one-quarter part of rubber will be found best; but even a less proportion will answer; but the proportion of rubber should not (unless it may be worked differently) be greater than will form a liquid or fluid mixture when heated with or in paraffine or when dissolved in the heated paraffine.

What I claim as my invention, and desire to secure by Letters Patent, is—

1. Insulating telegraph-wires and conductors or their supports with the material described, substantially as set forth.

2. The new article of manufacture described, constituting an insulated wire made substantially as set forth.

A. B. ELY.

Witnesses:
W. M. PARKER,
J. E. FARWELL.